United States Patent
Kamitani et al.

(10) Patent No.: US 11,090,723 B2
(45) Date of Patent: Aug. 17, 2021

(54) SUPPORT MEMBER FOR ADDITIVE MANUFACTURING, PRODUCTION METHOD AND PRODUCTION DEVICE FOR THREE-DIMENSIONAL OBJECT BY ADDITIVE MANUFACTURING, MANUFACTURED OBJECT MODEL CREATION DEVICE, CONTROL DEVICE, AND MANUFACTURING METHOD FOR MANUFACTURED OBJECT

(71) Applicant: MITSUBISHI HEAVY INDUSTRIES, LTD., Tokyo (JP)

(72) Inventors: Keisuke Kamitani, Tokyo (JP); Naoki Ogawa, Tokyo (JP); Kazunori Kuga, Tokyo (JP); Hiroaki Kyuno, Tokyo (JP)

(73) Assignee: MITSUISHI HEAVY INDUSTRIES, LTD., Tokyo (JP)

( * ) Notice: Subject to any disclaimer, the term of this patent is extended or adjusted under 35 U.S.C. 154(b) by 206 days.

(21) Appl. No.: 16/092,265

(22) PCT Filed: Apr. 11, 2017

(86) PCT No.: PCT/JP2017/014860
§ 371 (c)(1),
(2) Date: Oct. 9, 2018

(87) PCT Pub. No.: WO2017/179587
PCT Pub. Date: Oct. 19, 2017

(65) Prior Publication Data
US 2019/0105712 A1    Apr. 11, 2019

(30) Foreign Application Priority Data

Apr. 13, 2016   (JP) .............................. JP2016-080538
Feb. 20, 2017   (JP) .............................. JP2017-029060

(51) Int. Cl.
  *B33Y 10/00*     (2015.01)
  *B33Y 30/00*     (2015.01)
  (Continued)

(52) U.S. Cl.
  CPC ................ *B22F 10/00* (2021.01); *B22F 3/24* (2013.01); *B33Y 10/00* (2014.12); *B33Y 30/00* (2014.12);
  (Continued)

(58) Field of Classification Search
  CPC .... B22F 3/1055; B22F 3/24; B22F 2003/247; B22F 2999/00; B22F 2003/1058;
  (Continued)

(56) References Cited

U.S. PATENT DOCUMENTS

2012/0291983 A1* 11/2012 Graham ................. B22D 15/02
                                                              164/516
2016/0200050 A1*  7/2016 Volk ...................... B24B 31/006
                                                              700/98
(Continued)

FOREIGN PATENT DOCUMENTS

| JP | 2013-194263 | 9/2013 |
| JP | 2015-123687 | 7/2015 |
| JP | 2015-196265 | 11/2015 |

OTHER PUBLICATIONS

International Search Report dated Jun. 20, 2017 in corresponding International Application No. PCT/JP2017/014860.
(Continued)

*Primary Examiner* — Rebecca Janssen
(74) *Attorney, Agent, or Firm* — Wenderoth, Lind & Ponack, L.L.P.

(57) ABSTRACT

This support member for additive manufacturing is a support to be disposed below a manufactured portion of a particular overhanging portion of the three-dimensional object which
(Continued)

needs the support in the process of additively manufacturing the three-dimensional object. The support member is provided with: the support main body; and a polishing channel which is formed in the support main body so as not to be exposed to an interface with the three-dimensional object, and through which a polisher for polishing and removing the support main body is allowed to pass.

14 Claims, 13 Drawing Sheets

(51) Int. Cl.
| | | |
|---|---|---|
| *B22F 3/24* | (2006.01) | |
| *B33Y 50/02* | (2015.01) | |
| *B33Y 40/00* | (2020.01) | |
| *B22F 10/00* | (2021.01) | |
| *B33Y 70/00* | (2020.01) | |

(52) U.S. Cl.
CPC ............... *B33Y 40/00* (2014.12); *B33Y 50/02* (2014.12); *B33Y 70/00* (2014.12); *B22F 2003/247* (2013.01); *B22F 2999/00* (2013.01)

(58) Field of Classification Search
CPC ......... B33Y 40/00; B33Y 10/00; B33Y 30/00; B33Y 70/00; B33Y 50/02; Y02P 10/25
See application file for complete search history.

(56) References Cited

U.S. PATENT DOCUMENTS

2017/0144248 A1    5/2017  Yoshimura et al.
2018/0154441 A1*  6/2018  Miller ..................... B29C 64/40

OTHER PUBLICATIONS

Written Opinion of the International Searching Authority dated Jun. 20, 2017 in corresponding International Application No. PCT/JP2017/014860 (with English translation).

* cited by examiner (a)

(b)

(c)

(a) $0 < \theta < \theta_0$   (b) $\theta = \theta_0$   (c) $\theta > \theta_0$

SUPPORT MEMBER FOR ADDITIVE MANUFACTURING, PRODUCTION METHOD AND PRODUCTION DEVICE FOR THREE-DIMENSIONAL OBJECT BY ADDITIVE MANUFACTURING, MANUFACTURED OBJECT MODEL CREATION DEVICE, CONTROL DEVICE, AND MANUFACTURING METHOD FOR MANUFACTURED OBJECT

TECHNICAL FIELD

The present invention relates to a support member for additive manufacturing, a production method and a production device for a three-dimensional object by additive manufacturing, a manufactured object model creation device, a control device, and a manufacturing method for a manufactured object.

Priority is claimed on Japanese Patent Application No. 2016-080538, filed Apr. 13, 2016, and Japanese Patent Application No. 2017-029060, filed Feb. 20, 2017, the content of which are incorporated herein by reference.

BACKGROUND ART

In recent years, additive manufacturing methods for additively manufacturing a three-dimensional object (3D additive manufacturing methods) have been being developed. Such additive manufacturing methods include various methods such as, for example, powder bed laser lamination welding (selective laser melting, SLM). An additive manufacturing method in the field of metal manufacturing (a so-called metal additive manufacturing method) has also been developed.

In the case of the SLM method, a laser is selectively irradiated only to a necessary part of a powder bed that is configured by laying a material powder (material powder) in a layer shape to melt the part. The manufacturing is three-dimensionally performed by repeating this on all layers, and then a three-dimensional object can be obtained.

Incidentally, when a three-dimensional object is to be produced by adding a layer in this way, an overhanging portion does not have a layer configured to support its lower side. Thus, it is not possible to add a layer in an appropriate shape and it is not possible to secure the shape accuracy of a three-dimensional object to be manufactured. In this case, for example, as described in Patent Literature 1, a support (support member) serving as a base may be provided on an underlayer portion serving as an overhanging portion.

For example, when a product shape M1 having an overhanging portion as illustrated in FIG. 14(a) is manufactured, layers which do not have overhanging portions (here, up to an eighth layer) are added without hindrance as illustrated in FIG. 14(b). However, when there is an overhanging portion in the layers to be added (here, a ninth layer or more), it is not possible to appropriately manufacture the layers if there is no support member below the layers [refer to FIG. 14(c)].

Thus, the support serving as a base is also formed simultaneously with a manufactured object. In this case, it is necessary to additively manufacture the support itself as well continuously from the lowermost layer (that is, from a first layer to an eighth layer) [refer to FIG. 14(d)].

CITATION LIST

Patent Literature

[Patent Literature 1]

Japanese Unexamined Patent Application, First Publication No. 2015-123687

SUMMARY OF INVENTION

Technical Problem

Incidentally, as a property of a material powder, if the extent of an overhanging portion is small, there is usually no hindrance to the manufacturing of an upper layer and a support is not necessary even when there is no support immediately below the overhanging portion.

For example, as illustrated in FIG. 15, when there is an overhanging portion having a different overhanging angle in a product shape, in a case in which an overhanging angle $\theta$ is smaller than a reference angle $\theta_0$ as illustrated in FIG. 15(a) using a predetermined overhanging angle (reference angle) $\theta_0$ (for example, 45 degrees) illustrated in FIG. 15(b) as a reference, it is possible to appropriately manufacture a corresponding layer even when there is no support immediately below the overhanging portion and a support is not necessary.

On the other hand, when the overhanging angle $\theta$ is larger than the reference angle $\theta_0$ as illustrated in FIG. 15(c), a support is necessary immediately below the overhanging portion. The support needs to be removed after the completion of addition of layers and a manual task using a tool, machining, or the like is used to remove the support, but it is a very troublesome process.

Also, for example, when a support is provided in a narrow space such as a channel in a tubular structure, it is difficult to perform a manual task using a tool, machining, or the like when removing the support after a layer has been added.

Thus, it is desirable to be able to reliably remove all supports including a support member formed in a narrow space after a layer has been added while allowing a three-dimensional object to be accurately manufactured using the supports.

It is also necessary to prevent a manufactured three-dimensional object (product) from being damaged when removing a support.

The present invention is made in consideration of such problems and an objective of the present invention is to provide a support member for additive manufacturing, a production method and a production device for a three-dimensional object by additive manufacturing, a manufactured object model creation device, a control device, and a manufacturing method for a manufactured object which are capable of reliably and easily removing a support while appropriately manufacturing the three-dimensional object using the support when producing a three-dimensional object using an additive manufacturing method and preventing the three-dimensional object from being damaged after a layer has been added.

Solution to Problem

In order to achieve the above-described objective, the present invention includes the following aspects.

(1) A support member for additive manufacturing according to a first aspect of the present invention is a support member for additive manufacturing which is disposed below a manufactured portion of a three-dimensional object which needs a support in a process of additively manufacturing the three-dimensional object, the support member including: a support main body; and a channel which is formed inside the support main body not to be exposed at an interface with the three-dimensional object and through which a fluid for removing the support main body is allowed to pass.

(2) According to a second aspect of the present invention, in the support member for additive manufacturing according to the first aspect, an inner diameter of the channel may be set to be a reference diameter or less.

The reference diameter in this case is a maximum diameter at which the support main body can be additively manufactured even when a hollow hole such as the channel is provided.

(3) According to a third aspect of the present invention, in the support member for additive manufacturing according to the first or second aspect, a space having a closed cross-sectional shape may be formed below the manufactured portion, and the support main body may be disposed in the space to come into contact with the three-dimensional object over the entire circumference of the closed cross section.

(4) According to a fourth aspect of the present invention, in the support member for additive manufacturing according to the third aspect, the space having the closed cross-sectional shape may be a tubular channel space which forms tubular channels, the support main body may be formed over the entire circumference of at least a part of the tubular channel space in a longitudinal direction, and the channels may be formed along a circumferential wall surface of the tubular channel space.

(5) According to a fifth aspect of the present invention, in the support member for additive manufacturing according to the fourth aspect, the plurality of channels may be formed, and the plurality of channels may be formed parallel or substantially parallel to each other in the longitudinal direction of the tubular channel space.

(6) According to a sixth aspect of the present invention, in the support member for additive manufacturing according to the fifth aspect, the plurality of channels may be arranged such that a distance between neighboring channels is shorter than a distance between each of the channels and the interface.

(7) According to a seventh aspect of the present invention, in the support member for additive manufacturing according to any one of the fourth to sixth aspects, one end side space in which the support main body is not formed may be formed at one end of the tubular channel space in the longitudinal direction, each of the channels may have an inlet which opens to the one end side space and an outlet which opens to the other end side of the tubular channel space in the longitudinal direction, and a first channel control support configured to control a flow of the fluid may be attached adjacent to a portion of the one end side space in which the support main body is formed.

(8) According to an eighth aspect of the present invention, in the support member for additive manufacturing according to the seventh aspect, the other end side space in which the support main body is not formed may be formed at the other end of the tubular channel space in the longitudinal direction, and a second channel control support configured to control a flow of the fluid may be attached adjacent to a portion of the other end side space in which the support main body is formed.

(9) According to a ninth aspect of the present invention, the support member for additive manufacturing according to any one of the first to eighth aspects may be formed to have a density lower than that of the three-dimensional object using the same material powder as the three-dimensional object.

(10) According to a tenth aspect of the present invention, in the support member for additive manufacturing according to any one of the first to ninth aspects, the three-dimensional object may be a metallic three-dimensional object manufactured from a metal powder.

(11) A production method of a three-dimensional object by additive manufacturing according to an eleventh aspect of the present invention includes: an additive manufacturing step of additively manufacturing a three-dimensional object including a manufactured portion which needs a support and the support for additive manufacturing according to any one of the first to tenth aspects disposed below the manufactured portion; and a support removal step of removing the support member for additive manufacturing by allowing the fluid to pass through the channel of the support member for additive manufacturing for the three-dimensional object in which the support member for additive manufacturing is integrally additively manufactured in the additive manufacturing step.

(12) According to a twelfth aspect of the present invention, in the production method for a three-dimensional object according to the eleventh aspect, in the additive manufacturing step, the three-dimensional object and the support for additive manufacturing may be additively manufactured by a powder bed laser lamination welding method.

(13) A production device for a three-dimensional object by additive manufacturing according to a thirteenth aspect of the present invention includes: an additive manufacturing device configured to additively manufacture a three-dimensional object including a manufactured portion which needs a support and the support for additive manufacturing according to any one of the first to tenth aspects disposed below the manufactured portion; and a support removal device configured to remove the support for additive manufacturing by allowing the fluid to pass through the channel of the support member for additive manufacturing for the three-dimensional object in which the support member for additive manufacturing is integrally additively manufactured by the additive manufacturing device.

(14) According to a fourteenth aspect of the present invention, in the production device for a three-dimensional object according to the thirteenth aspect, the additive manufacturing device may additively manufacture the three-dimensional object and the support for additive manufacturing by a powder bed laser lamination welding method.

(15) A manufactured object model creation device according to a fifteenth aspect of the present invention is a manufacturing model creation device which creates a manufacturing model serving as three-dimensional graphic data used for manufacturing control of a manufactured object having a three-dimensional shape, the manufactured object model creation device including: an acquisition unit configured to acquire a three-dimensional manufacturing model serving as three-dimensional graphic data configured of a three-dimensional object figure indicating a shape of the three-dimensional object; an identification unit configured to identify an overhanging portion serving as a manufactured portion in the three-dimensional object figure which needs a support; and a creation unit configured to create the manufacturing model by adding a support member figure indicating a shape of the support member for additive manufacturing according to any one of the first to tenth aspects in contact with a lower side of the overhanging portion to the three-dimensional object figure.

(16) A control device for an additive manufacturing device according to a sixteenth aspect of the present invention is a control device for an additive manufacturing device which manufactures a manufactured object having a three-dimensional shape by adding a material, the control device including: a division unit configured to create a plurality of divided manufacturing models by dividing, in a height direction, a manufacturing model which includes a three-dimensional object figure indicating a shape of the three-dimensional object and a support member figure indicating a shape of the support member for additive manufacturing including a support main body which supports an overhanging portion serving as a manufactured portion in the three-dimensional object which needs a support from below and a channel which is formed inside the support main body not to be exposed at an interface with the three-dimensional object and through which a fluid for removing the support main body is allowed to pass; a selection unit configured to select a divided manufacturing model in order from a lower side among the plurality of divided manufacturing models; a first instruction creation unit configured to create a first irradiation instruction for irradiating a portion corresponding to the three-dimensional object figure of the selected divided manufacturing model in a material layer laid on a platform with a laser beam; and a second instruction creation unit configured to create a second irradiation instruction for irradiating a portion in the material corresponding to the support member figure of the selected divided manufacturing model with a laser beam so that a sintered layer having density lower than that of a sintered layer formed through irradiation of a laser beam based on the first irradiation instruction is formed.

(17) A manufacturing method according to a seventeenth aspect of the present invention is a manufacturing method for a manufactured object in which the manufactured object having a three-dimensional shape is manufactured by an additive manufacturing device adding a material, the method including: creating a plurality of divided manufacturing models by dividing, in a height direction, a manufacturing model which includes a three-dimensional object figure indicating a shape of the three-dimensional object and a support member figure indicating a shape of the support member for additive manufacturing including a support main body which supports an overhanging portion serving as a manufactured portion in the three-dimensional object which needs a support from below and a channel which is formed inside the support main body not to be exposed at an interface with the three-dimensional object and through which a fluid for removing the support main body is allowed to pass; selecting a divided manufacturing model in order from a lower side among the plurality of divided manufacturing models; forming a sintered layer corresponding to the three-dimensional object by irradiating a portion corresponding to the three-dimensional object figure of the selected divided manufacturing model in a material layer laid on a platform with a laser beam; and forming a sintered layer corresponding to the support member for additive manufacturing having a density lower than that of a sintered layer corresponding to the three-dimensional object by irradiating a portion in the material corresponding to the support member figure of the selected divided manufacturing model with a laser beam.

Advantageous Effects of Invention

According to at least one of the above aspects, it is possible for the support for additive manufacturing disposed below the manufactured portion having a condition that it needs a support to secure the shape accuracy of the three-dimensional object when the three-dimensional object is additively manufactured.

Also, after manufacturing, the support for additive manufacturing can be removed by passing a fluid through the channel inside the support main body. Since the fluid can be passed using a machine, it is possible to easily remove the support for additive manufacturing.

Since the channel is formed not to be exposed at the interface with the three-dimensional object inside the support main body, it is difficult for the fluid to directly pass along the surface of the three-dimensional object and it is possible to prevent the surface of the three-dimensional object from being cut and damaged with the fluid.

DESCRIPTION OF EMBODIMENTS

Embodiments associated with the present invention will be described below with reference to the drawings.

Note that embodiments to be illustrated below are merely examples and it is not intended to exclude various modifications and technical applications which are not explicitly described in the following embodiments. Constitutions of the following embodiments can be implemented by variously modifying the constitutions without departing from the scope of the present invention, can be selected as necessary or can be appropriately combined.

[3D Additive Manufacturing Method]

First, an additive manufacturing method (3D additive manufacturing method) using additive manufacturing (3D additive manufacturing) for a three-dimensional object in embodiments will be described.

In the embodiments, additive manufacturing for a metal three-dimensional object is performed through a powder bed laser lamination welding (selective laser melting; SLM) method (SLM method) using a material powder of a metal material (for example, nickel-based superalloy).

Figure 2:
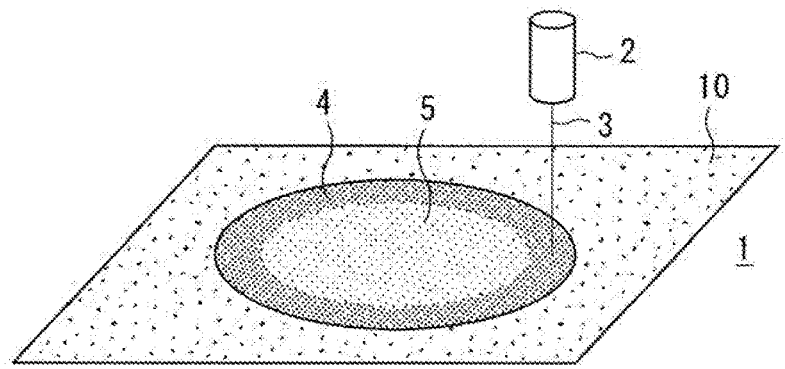
FIG. 2 is a schematic diagram for explaining an additive manufacturing method according to each embodiment of the present invention and shows a state in which additive processing proceeds in the order of (a) to (c).
Figure 2:
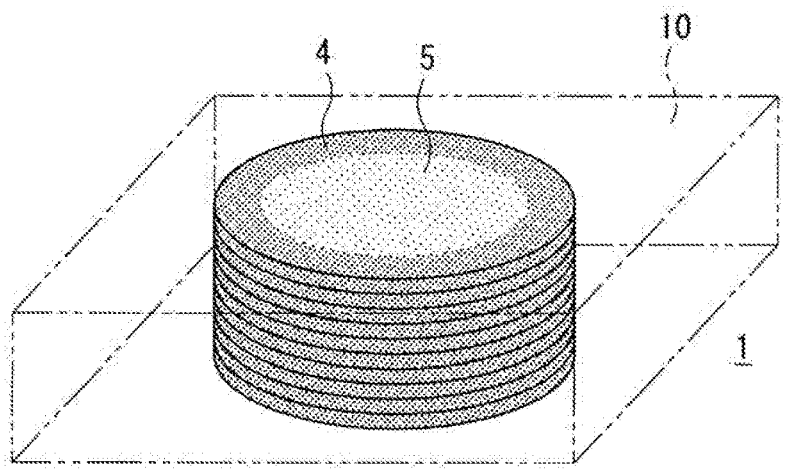
Figure 2:
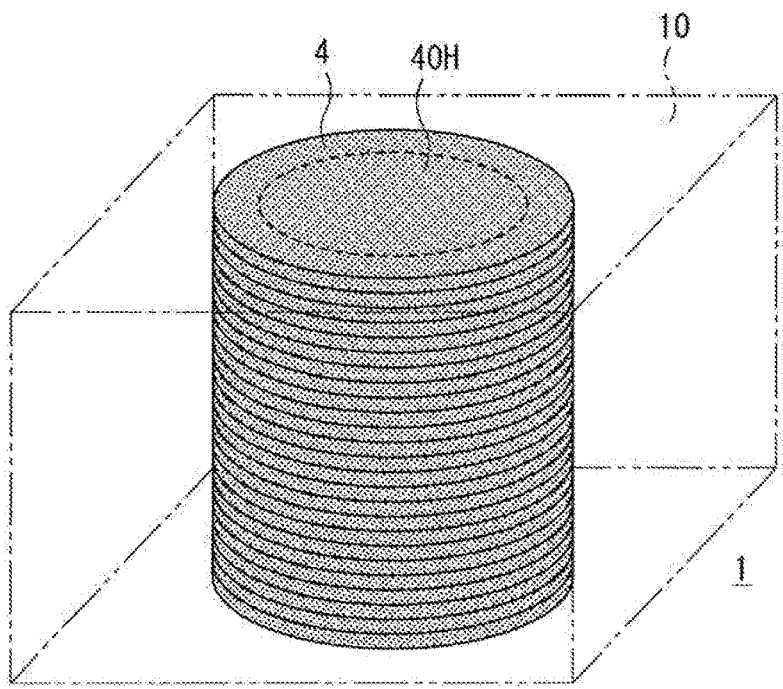

As illustrated in FIG. 2, in the SLM method, a corresponding layer is manufactured by selectively irradiating only a necessary part of a powder bed 10 formed by bedding a material powder in a layer shape on a platform (here, a lifting platform which moves upward and downward) 1 with a laser beam 3 from a laser device 2 and melting a material powder of a main part in the powder bed 10 [refer to FIG. 2(a)].

A three-dimensional object 4 as illustrated in FIG. 2(c) is produced by adding each layer as illustrated in FIG. 2(b) while moving the platform 1 downward to the extent corresponds to one layer and manufacturing each layer.

At that time, when an irradiation density of the laser beam 3 is increased, high-density manufacturing is obtained and when an irradiation density of the laser beam 3 is decreased, low-density manufacturing is obtained. Since a strength of a low-density manufacturing portion is lower than that of a high-density manufacturing portion, cutting removal is easy. Thus, as illustrated in FIG. 2, the three-dimensional object 4 is formed by the high-density manufacturing portion and a support for additive manufacturing (a support member; hereinafter simply also referred to as a "support") 5 is formed by the low-density manufacturing portion.

The support 5 is formed below a manufactured portion of a particular overhanging portion of the three-dimensional object 4 which needs a support. The particular overhanging portion is an overhanging portion whose overhanging angle is a reference angle $\theta_0$ or more. The reference angle of the overhanging angle is a boundary angle serving as a reference for determining whether a corresponding layer can be manufactured even when a support is not provided directly below the layer. The reference angle $\theta_0$ is, for example, 45 degrees. It should be noted that, even when the reference angle $\theta_0$ of the overhanging angle is smaller than 45 degrees, there is a case in which a support is provided or a case in which it is unnecessary to support a manufactured portion up to the reference angle $\theta_0$ of about 60 degrees by devising how to bed a material powder in accordance with a device in some cases.

In the case of the three-dimensional object 4 exemplified here, the lower part of a portion denoted by reference symbol 4OH at an upper apex is a cavity and corresponds to a particular overhanging portion which needs a support. For this reason, the support 5 is formed below a manufactured portion of the particular overhanging portion 4OH.

Since it is necessary to remove the support 5 from the three-dimensional object 4 after being additively manufactured together with the three-dimensional object 4, the support 5 has a unique structure so that this removal can be performed reliably and easily while preventing damage to the three-dimensional object 4.

Embodiments associated with a production method and a production device of the support 5 and the three-dimensional object using the support 5 will be described below. Hereinafter, a structure which includes the three-dimensional object 4 and the support 5 created by an additive manufacturing device is referred to as a manufactured object 9.

First Embodiment (Constitution of Support Member for Additive Manufacturing)

Figure 3:
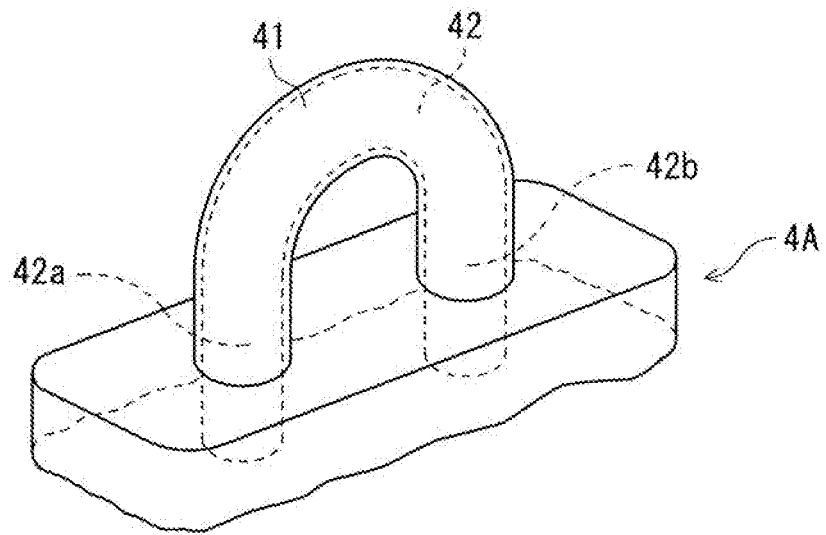
FIG. 3 is a perspective view showing a main part shape of the three-dimensional object according to the first embodiment of the present invention.

As illustrated in FIG. 3, the three-dimensional object 4A according to this embodiment includes a tubular portion 41 in a part thereof, the tubular portion 41 having a tubular channel (tubular channel space) 42 as a closed cross-sectional-shaped space inside thereof. The tubular channel 42 has its axial center formed in a circular arc shape, has one end side 42a and the other end side 42b which are steeply inclined, and has an intermediate portion which is gently inclined. A portion corresponding to the particular overhanging portion to be supported by the support is present on an upper wall portion located vertically above a portion whose inclination is gentle at the intermediate portion of the tubular channel 42.

Figure 4A:
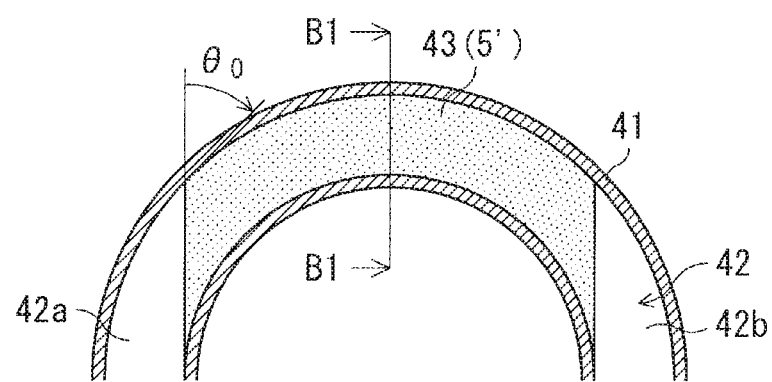
FIG. 4A is a vertical cross-sectional view showing a main part of a support and a three-dimensional object at a stage before development of this support exemplified as a comparative example of the first embodiment of the present invention.
Figure 4B:
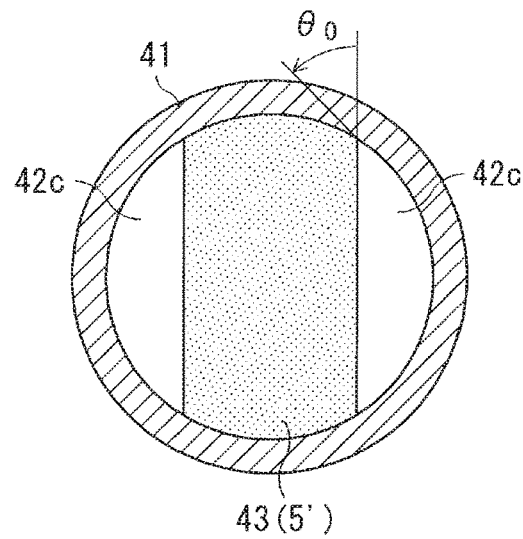
FIG. 4B is a diagram showing a main part of a support and a three-dimensional object at a stage before development of this support exemplified as a comparative example of the first embodiment of the present invention and is a cross-sectional view taken along line B1-B1 in FIG. 4A.

FIGS. 4A and 4B are diagrams for explaining the particular overhanging portion in the tubular portion 41. As illustrated in FIGS. 4A and 4B, a region of an upper tubular wall portion in the tubular portion 41 which needs a support 5' is a region 43 which is immediately below the particular overhanging portion whose overhanging angle is the reference angle $\theta_0$ or more. A channel inner wall in the tubular channel 42 is the region 43 immediately below a portion inclined by the reference angle $\theta_0$ or more in a channel direction as well as a direction orthogonal to the channel direction.

Although it is necessary to form the support 5' in the region 43, since a portion of the overhanging portions on the one end side 42a and the other end side 42b of the tubular channel 42 in which the overhanging angle is less than the reference angle $\theta_0$ and side regions 42c and 42c of the intermediate portion in the tubular channel 42 which are inclined by the reference angle $\theta_0$ or more in the channel direction but are inclined by less than the reference angle $\theta_0$ in the direction orthogonal to the channel direction do not correspond to portions which are immediately below the particular overhanging portion, it is not necessary to form the support 5'.

Figure 1A:
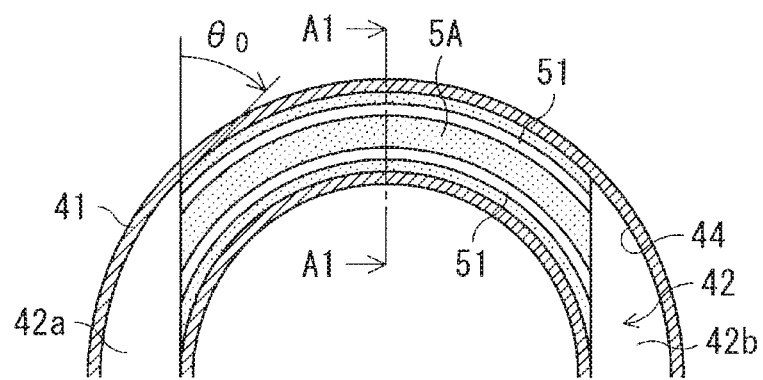
FIG. 1A is a vertical cross-sectional view showing a main part of a support and a three-dimensional object according to a first embodiment of the present invention.
Figure 1B:
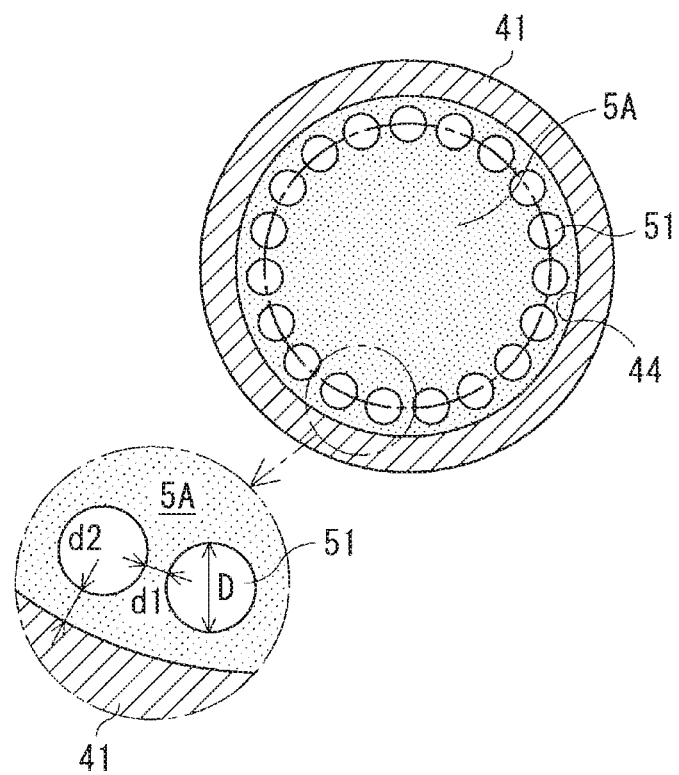
FIG. 1B is a diagram showing the main part of the support and the three-dimensional object according to the first embodiment of the present invention and is a cross-sectional view taken along line A1-A1 in FIG. 1A.

On the other hand, in this embodiment, as illustrated in FIGS. 1A and 1B, a support (support main body) 5A is formed over the entire circumference in the region of the intermediate portion of the tubular channel 42 in which the overhanging angle is the reference angle $\theta_0$ or more in the channel direction. That is to say, as illustrated in FIG. 1B, the support 5A is also formed in the region 43 which is immediately below the particular overhanging portion as well as the side regions 42c and 42c which are not immediately below the particular overhanging portion on the side thereof [refer to FIG. 4B].

In this way, the support 5A is formed over the entire circumference of the tubular channel 42 which is immediately below the particular overhanging portion including the side regions 42c and 42c in consideration of the fact that the support 5A is deleted by allowing a polisher (fluid) to pass in the tubular channel 42.

The support 5A is not formed on the one end side 42a and the other end side 42b of the tubular channel 42 in which the overhanging angle of the upper tubular wall portion is less than the reference angle $\theta_0$.

As illustrated in FIGS. 1A and 1B, polishing channels 51 (channels) through which a polisher passes are formed inside the support 5A. The polishing channels 51 are formed not to be exposed at an interface (an inner wall of the tubular portion 41) 44 between the support 5A and the tubular portion 41 of the three-dimensional object 4A. Here, the plurality of polishing channels 51 are formed parallel to each other in a longitudinal direction of the tubular channel 42 along the inside of the interface 44.

An inner diameter D of the polishing channels 51 is set to be a reference diameter D0 or less. This is because the polishing channels 51 are formed in the support 5A in a cavity state. When the overhanging angle is the reference angle $\theta_0$ or more as described above, it is necessary to provide a support for forming the support 5A. However, in the case of a hole with a minute inner diameter D, it is possible to perform additive manufacturing without an underlayer even when the overhanging angle is the reference angle $\theta_0$ or more, for example, 90 degrees.

The reference diameter D0 is a diameter which is a reference for determining whether a cavity can be manufactured even when there is no support immediately below the overhanging portion. Although the reference diameter D0 is considered to depend on the properties of a material powder, for example, when a nickel-based superalloy is used as a metal material of the material powder, the reference diameter D0 is about 5 to 10 mm.

Also, the plurality of polishing channels 51 are disposed inside the interface 44 at equal intervals in an annular shape and neighboring polishing channels 51 are disposed so that a distance d1 between the polishing channels 51 is shorter than a distance d2 between each of the polishing channels 51 and the interface 44.

(Action and Effect of Support Member for Additive Manufacturing)

Next, a production method and a production device of the three-dimensional object 4A through additive manufacturing using the support 5A will be described and an action and an effect of the support 5A will be described.

As described above, first, the three-dimensional object 4A and the support 5A are additively manufactured by melting material powders of the main part in the layered powder bed 10 using the SLM method by an additive manufacturing device including the platform 1, the laser device 2, and the like (refer to FIG. 2) (additive manufacturing step). As a result, the three-dimensional object 4A is formed as illustrated in FIG. 3 and the support 5A having the polishing channels 51 is formed in the tubular channel 42 inside the tubular portion 41 of the three-dimensional object 4A as illustrated in FIGS. 1A and 1B. That is to say, the additive manufacturing device creates the manufactured object 9A including the three-dimensional object 4A and the support 5A.

Figure 1C:
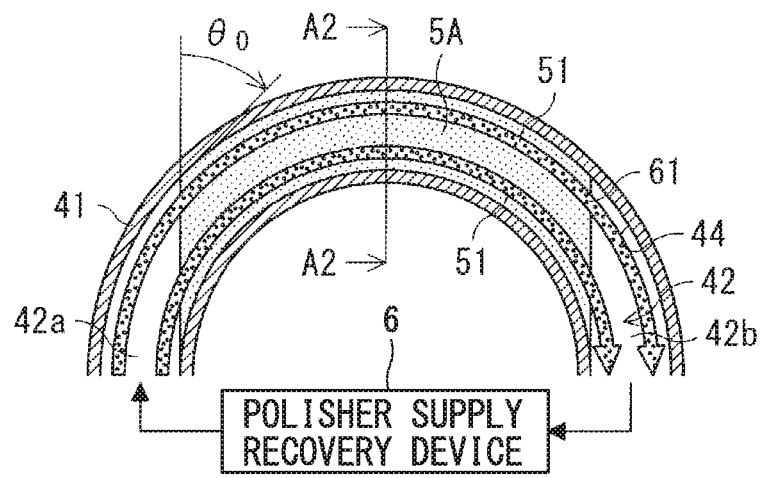
FIG. 1C is a diagram showing the main part of the support and the three-dimensional object according to the first embodiment of the present invention and is a vertical cross-sectional view of a state in which a polisher is allowed to pass.

Subsequently, the support 5A is polished and removed from the manufactured object 9A which is the three-dimensional object 4A having the support 5A integrally additively manufactured inside the tubular portion 41 using a support removal device having a polisher supply and recovery device 6 as illustrated in FIG. 1C by allowing a polisher 61 to pass through the polishing channels 51 formed in the support 5A (support removal step). The polisher supply and recovery device 6 supplies the polisher 61 with a predetermined characteristic into the tubular portion 41 and recovers the polisher 61 discharged from the inside of the tubular portion 41 at a predetermined amount and a predetermined rate in accordance with an operation instruction.

Figure 1D:
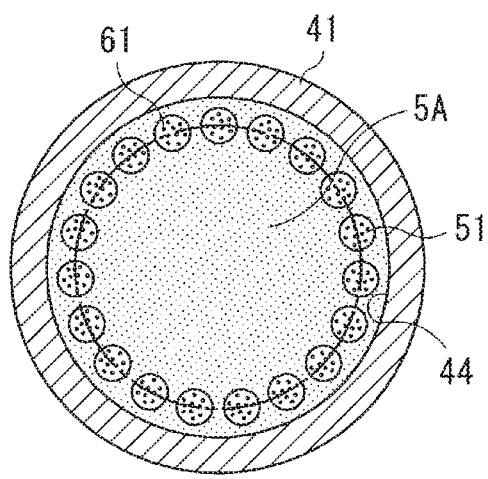
FIG. 1D is a diagram showing the main part of the support and the three-dimensional object according to the first embodiment of the present invention and is a cross-sectional view taken along line A2-A2 in FIG. 1C.

That is to say, the polisher supply and recovery device 6 supplies a fluid (liquid or gas, hereinafter also referred to as a "polishing fluid") including the polisher 61 through the one end side 42a of the tubular channel 42 and recovers the polishing fluid through the other end side 42b. Thus, since the polisher 61 passes inside the polishing channels 51 as illustrated in FIG. 1D, inner walls of the polishing channels 51 are polished and thus an inner diameter of the polishing channels 51 increases.

Figure 1E:
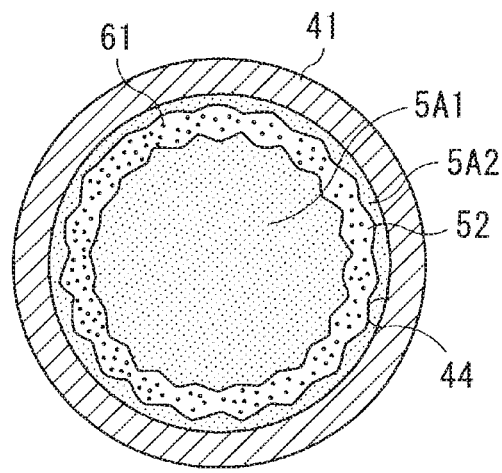
FIG. 1E is a diagram showing the main part of the support and the three-dimensional object according to the first embodiment of the present invention and is a cross-sectional view corresponding to FIG. 1D showing a process in which a support is polished by a polisher.

The distance d1 between the neighboring polishing channels 51 is shorter than the distance d2 between each of the polishing channels 51 and the interface 44. Thus, when an inner diameter of the polishing channel 51 increases, before the polishing channel 51 reaches the interface 44, as illustrated in FIG. 1E, the neighboring polishing channels 51 communicate with each other and thus the plurality of polishing channels 51 become an annular polishing channel 52.

Here, a polishing rate of the support 5A is set in accordance with the conditions such as the viscosity of a polisher, an amount of abrasive grains included in a polisher, a material, a shape, and a size. Furthermore, since the polishing rate is affected by a flow rate of a portion to be polished, a channel diameter and a distance between channels (polishing margin) are determined from the polishing rate and a degree of allowable damage in a product.

In addition, it becomes easier to perform dividing by increasing the number of channels and it is possible to further reduce a size of a removal piece of the support 5A.

Thus, a portion 5A1 of the support 5A in the annular polishing channel 52 is discharged and removed to the other end side 42b together with the polishing fluid. After that, the remaining portion 5A2 of the support 5A remaining in the vicinity of the interface 44 is polished by the polisher 61 and is discharged and removed. In this way, since the annular polishing channel 52 is formed as described above by providing a channel group formed of the plurality of polishing channels 51, most part of the support 5A (portion 5A1) located inside the polishing channel 52 can be removed.

Therefore, it is possible to reliably and easily remove the support 5A from the manufactured object 9A using the polishing fluid including the polisher 61.

Also, in the removal of the support 5A, since the polisher 61 comes into contact with the three-dimensional object 4A at the time of a final stage at which the support 5A is polished, discharged, and removed, a concern concerning the damage of the three-dimensional object (product) 4A by the polisher 61 is resolved or reduced.

Here, as a comparative example of this embodiment, assuming a case in which, in the structure of the support 5' described with reference to FIGS. 4A and 4B, the case removing the support 5' by allowing the polishing fluid to pass through the side regions 42C and 42C of the intermediate portion in the tubular channel 42 formed as a space in a portion which is not immediately below the particular overhanging portion and thereby it is not necessary to from the support 5'.

Figure 4C:
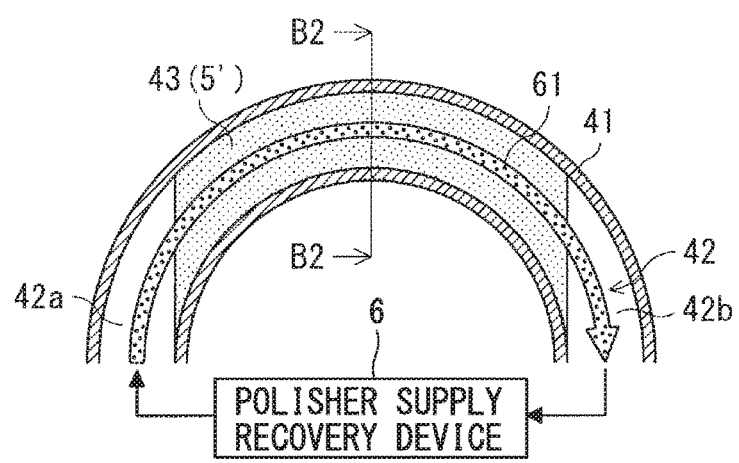
FIG. 4C is a diagram showing a main part of a support and a three-dimensional object at a stage before development of this support exemplified as a comparative example of the first embodiment of the present invention and is a vertical cross-sectional view of a state in which a polisher is allowed to pass.
Figure 4D:
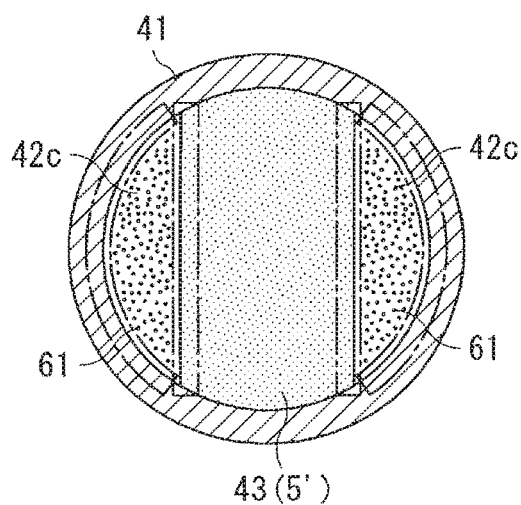
FIG. 4D is a diagram showing a main part of a support and a three-dimensional object at a stage before development of this support exemplified as a comparative example of the first embodiment of the present invention and is a cross-sectional view taken along line B2-B2 in FIG. 4C.

In this case, for example, as illustrated in FIGS. 4C and 4D, the polisher 61 passes through the side regions 42c and 42c. As indicated by an alternate long and two short dashed line in FIG. 4D, a side surface of the support 5' and an inner wall surface of the tubular portion 41 in the three-dimensional object 4A face the side regions 42c and 42c and the polisher 61 passes along and polishes the surfaces.

Although the tubular portion 41 has a higher strength than the support 5', when the polisher 61 passes through the tubular portion 41, the inner wall surface of the tubular portion 41 is also polished by the polisher 61 although an amount of polishing is not corresponding to a degree of polishing of the support 5'.

When the polisher 61 comes into contact with the three-dimensional object 4A from the initial stage of the support removal step, the tubular portion 41 of the three-dimensional object 4A is polished for a long period of time. Thus, the damage to be received is likely to be large.

In this regard, since the polisher 61 comes into contact with the three-dimensional object 4A only at the end of the support removal step in this support 5A, the three-dimensional object 4A is not likely to be damaged from the polisher 61.

Second Embodiment (Constitution of Support Member for Additive Manufacturing)

Figure 5:
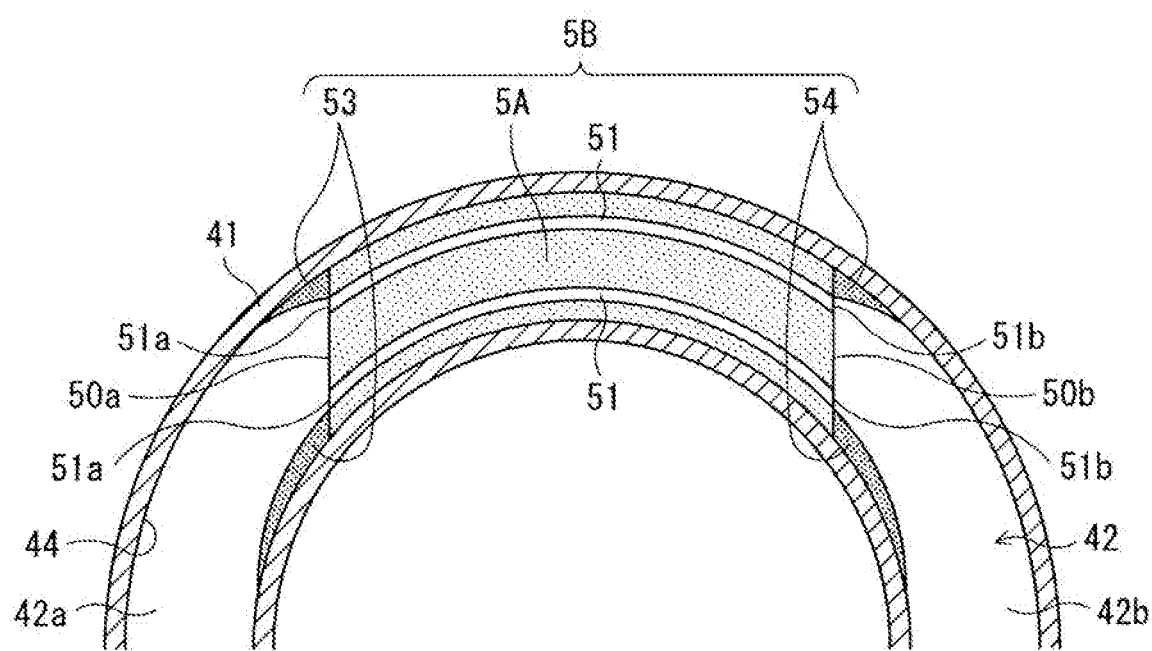
FIG. 5 is a vertical cross-sectional view showing a main part of a support and a three-dimensional object according to a second embodiment of the present invention.

As illustrated in FIG. 5, a support 5B for additive manufacturing according to this embodiment is configured by attaching a first channel control support 53 and a second channel control support 54 for controlling a flow of a polisher to the support for additive manufacturing according to the first embodiment (which is set to a support main body) 5A.

The polishing channel 51 includes an inlet 51a which opens to a space on the one end side 42a of the tubular channel 42 and an outlet 51b which opens to a space on the other end side 42b of the tubular channel 42. The first channel control support 53 is disposed adjacent to a location in which the support main body 5A in the space on the one end side 42a is formed. Furthermore, the second channel control support 54 is disposed adjacent to a location in which the support main body 5A in the space on the other end side 42b is formed.

The first channel control support 53 is disposed at a portion on the one end side 42a of the tubular channel 42 immediately before the support main body 5A of the inner wall 44 in the tubular portion 41. The first channel control support 53 is formed in an annular shape so that the inner wall 44 in the tubular portion 41 is gradually thickened and overlaid toward the support main body 5A.

When the polishing fluid is supplied to the polishing channel 51 of the support main body 5A on the one end side 42a of the tubular channel 42, there is a concern concerning a part of the polishing fluid which collides with a step difference of an end wall 50a in the support main body 5A immediately before the inlet 51a of the polishing channel 51 and thus whose flow is disturbed and the polishing of the inner wall 44 due to the collision of the polisher 61 with the inner wall 44 of the tubular portion 41 in the vicinity of the end wall 50a.

Thus, the first channel control support 53 is attached so that the inner wall 44 in the vicinity of the end wall 50a in the support main body 5A is protected and the polishing fluid smoothly passes into the polishing channel 51 through the inlet 51a on the one end side 42a. An inner circumferential surface of the first channel control support 53 is formed in a tapered cylinder shape in which a flow smoothly decreases from the inner wall 44 to an outer end edge of the polishing channel 51.

The second channel control support 54 is disposed at a portion immediately after the support main body 5A of the inner wall 44 in the tubular portion 41 on the other end side 42b of the tubular channel 42. The second channel control support 54 is formed in an annular shape in which the inner wall 44 of the tubular portion 41 is overlaid, in which the support main body 5A is the thickest, whose thickness gradually decreases as it goes from the support main body 5A.

There is a concern concerning a flow of the polishing fluid discharged through the outlet 51b of the polishing channels 51 in the support main body 5A on the other end side 42b of the tubular channel 42 being disturbed, the polisher 61 colliding with the inner wall 44 in the vicinity of the end wall 50b, and the inner wall 44 to be polished because a diameter suddenly increases at a step difference of an end wall 50b of the support main body 5A immediately after the outlet 51b of the polishing channel 51.

Thus, the second channel control support 54 is attached so that the inner wall 44 in the vicinity of the end wall 50b in the support main body 5A is protected and the polishing fluid smoothly passes into the polishing channel 51 through the outlet 51b on the other end side 42b. An inner circumferential surface of the second channel control support 54 is formed in a tapered cylinder shape in which a flow smoothly expands from the outer end edge of the polishing channel 51 to the inner wall 44.

(Action and Effect of Support Member for Additive Manufacturing)

An action and an effect of the support 5B will be described below.

Note that a production method and a production device for a three-dimensional object 4A through additive manufacturing using the support 5B is the same as the first embodiment and thus description thereof will be omitted.

According to the support 5B, the polishing fluid passes into the inlet 51a of each polishing channel 51 while being smoothly reduced along the inner circumferential surface of the first channel control support 53 installed on the inner wall 44 in the vicinity of the end wall 50a of the support main body 5B on the one end side 42a of the tubular channel 42. For this reason, the inner wall 44 in the vicinity of the end wall 50a of the support main body 5B is protected from the polisher 61, the polishing fluid is smoothly supplied to each polishing channel 51, and thus the polishing efficiency is improved.

Also, the polishing fluid passing out through the outlet 51b of each polishing channel 51 on the other end side 42b of the tubular channel 42 passes out while smoothly expanding along the inner circumferential surface of the second channel control support 54 installed on the inner wall 44 in the vicinity of the end wall 50b in the support main body 5A. For this reason, the inner wall 44 in the vicinity of the end wall 50b of the support main body 5A is protected from the polisher 61, the polishing fluid is smoothly discharged from each polishing channel 51, and thus the polishing efficiency is improved.

Third Embodiment (Constitution of Support Member for Additive Manufacturing)

Figure 6:
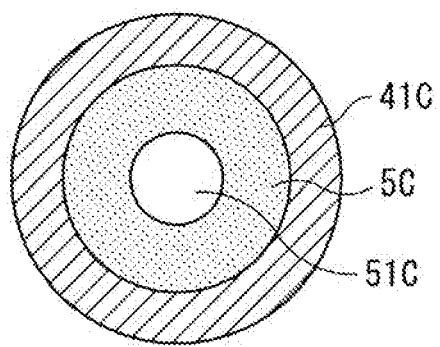
FIG. 6 is a horizontal cross-sectional view showing a main part of a support and a three-dimensional object according to a third embodiment of the present invention.

As described in FIG. 6, a three-dimensional object (not shown) according to this embodiment includes a tubular portion 41C having a tubular channel with a minute inner diameter. A support 5C for additive manufacturing is formed in at least a part of a tubular channel inside the tubular portion 41C. Since the inner diameter of the tubular channel is minute, only one polishing channel 51C is formed on an axial center portion of the tubular channel. Of course, an inner diameter of the polishing channel 51C is set to be the reference diameter or less.

(Action and Effect of Support Member for Additive Manufacturing)

In this way, since a support 5C for additive manufacturing is formed, when the support 5C is polished and removed, the support 5C is polished by allowing the polishing fluid to pass through the polishing channel 51C formed in the axial center portion as in the first embodiment. Since an inner wall of the tubular portion 41C is exposed for the first time at a stage at which an inner diameter of the polishing channel 51C gradually increases along with the progress of polishing and the support 5C is mostly polished and removed, the tubular portion 41C is not likely to be damaged from a polisher 61.

Fourth Embodiment

Figure 7:
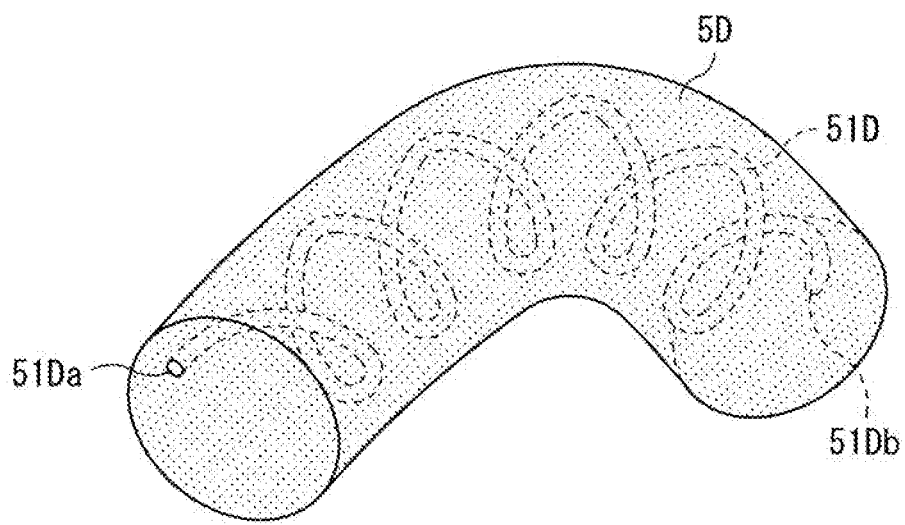
FIG. 7 is a perspective view showing a support according to a fourth embodiment of the present invention.

As illustrated in FIG. 7, a support 5D for additive manufacturing according to this embodiment is configured such that a polishing channel 51D is formed in a spiral shape from an inlet 51Da toward an outlet 51Db in the vicinity of an outer circumferential surface of the support 5D (a boundary between the support 5D and a tubular portion (not shown)).

Also with such a constitution, it is possible to polish the support 5D by allowing a polishing fluid to pass through the polishing channel 51D in a state in which a tubular portion is not likely to be damaged from a polisher 61.

Fifth Embodiment

Figure 8:
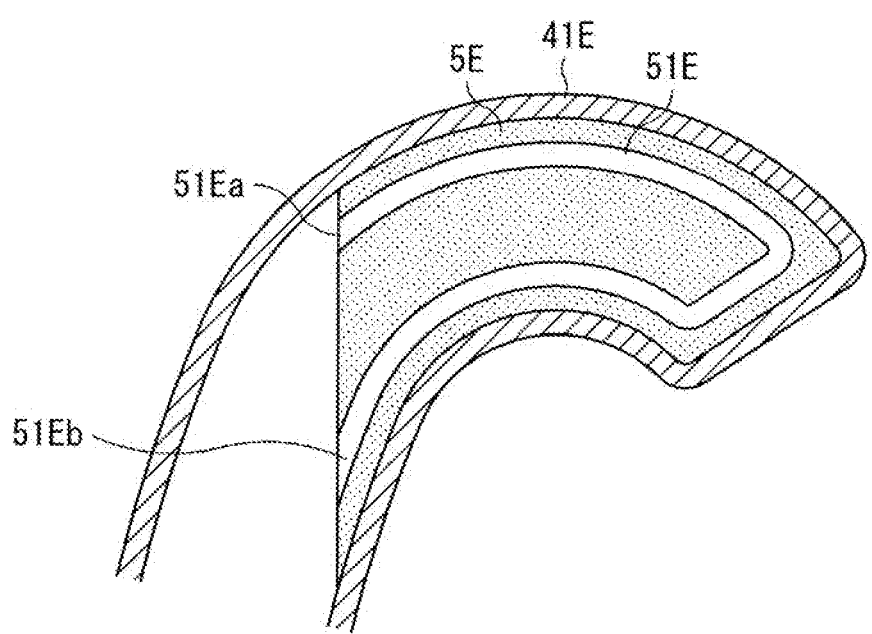
FIG. 8 is a vertical cross-sectional view showing a main part showing a support and a three-dimensional object according to a fifth embodiment of the present invention.

As illustrated in FIG. 8, a three-dimensional object (not shown) according to this embodiment includes a tubular portion 41E whose distal end is closed in a dead end shape and a support 5E for additive manufacturing is disposed in a dead-end-shaped depth portion of the tubular portion 41E. The polishing channel 51E for the support 5E includes an inlet 51Ea and an outlet 51Eb on an open end side of the tubular portion 41E and is formed such that a polisher passes into the dead-end-shaped depth portion through the inlet 51Ea, hangs a U, and returns to the outlet 51Eb.

The polishing channel 51E is formed in the vicinity of an outer circumferential surface thereof (an interface between the support 5E and the tubular portion 41E) inside the support 5E. Here, although only one polishing channel 51E is illustrated, a plurality of polishing channels 51E are formed in parallel. In this case, at the U turn portion, each polishing channel 51E is configured to hang a U.

Alternatively, a plurality of going paths of the polishing channel 51E from the inlet 51Ea toward a depth portion may be formed to pass through the vicinity of an outer circumferential surface of the support 5E and be collected at the U turn portion and one returning path of the polishing channel 51E from the depth portion toward the outlet 51Eb may be formed to pass through the vicinity of an axial center of the support 5E.

Also, the spiral structure illustrated in FIG. 7 may be applied to the support 5E having the inlet 51Ea and the outlet 51Eb at its one end in this way.

With such a constitution, even for the support 5E of the tubular portion 41E whose distal end is closed in a dead end shape, it is possible to polish the support 5E by allowing the polishing fluid to pass through the polishing channel 51E in a state in which the tubular portion is not likely to be damaged from the polisher 61.

Sixth Embodiment (Constitution of Support Member for Additive Manufacturing)

Figure 9:
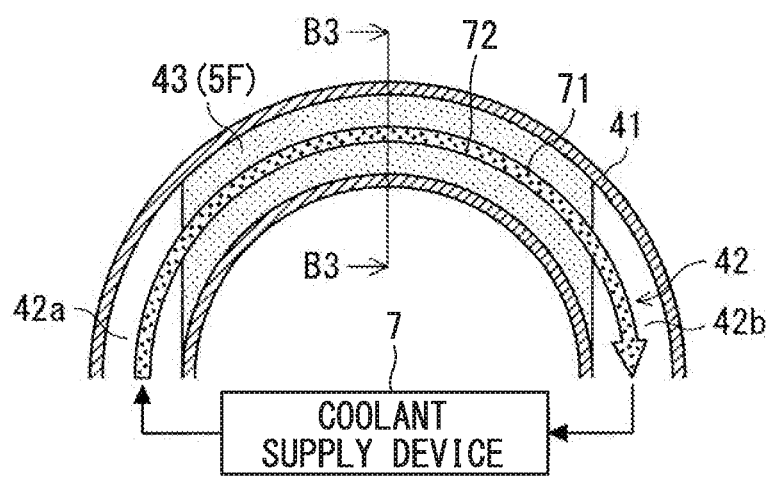
FIG. 9 is a vertical cross-sectional view showing a main part of a support and a three-dimensional object according to a sixth embodiment of the present invention.
Figure 10:
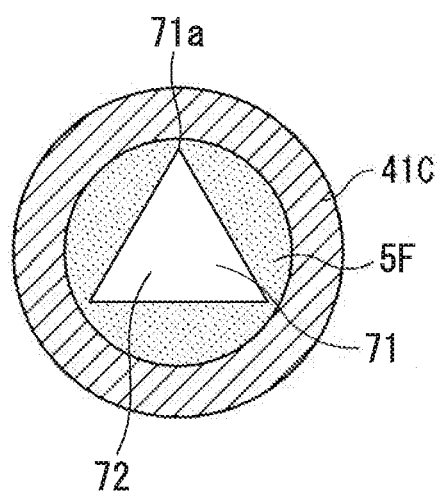
FIG. 10 is a cross-sectional view taken along line B3-B3 illustrated in FIG. 9.

As illustrated in FIG. 9, a three-dimensional object (not shown) according to this embodiment has a constitution in which a coolant channel 71 (channel) through which a coolant 72 (fluid) passes is formed in a support 5F for additive manufacturing instead of the polishing channel in the first embodiment. That is to say, in this embodiment, a tubular portion 41 having a tubular channel with a minute inner diameter is provided and the support 5F is formed on at least a part of a tubular channel 42 inside the tubular portion 41. Moreover, as illustrated in FIG. 10, only one coolant channel 71 having a triangular cross section is formed in an axial center portion of the tubular channel 42. The coolant channel 71 is disposed toward the uppermost portion of the tubular portion 41 in a cross-sectional view of any upper apex (ceiling portion 71a).

(Action and Effect of Support Member for Additive Manufacturing)

Next, a production method for a three-dimensional object by additive manufacturing using the support 5F will be described and an action and an effect of the support 5F will be described.

As illustrated in FIG. 9, the three-dimensional object and the support 5F are additively manufactured to form the three-dimensional object by the additive manufacturing device (refer to FIG. 2) as in the above-described first embodiment and the support 5F having the coolant channel 71 is formed in the tubular channel 42 inside the tubular portion 41 in the three-dimensional object.

Subsequently, the support 5F is peeled off and removed by allowing, for example, a coolant 72 such as liquid nitrogen to pass through the coolant channel 71 formed in the support 5F with respect to the three-dimensional object in which the support 5F is integrally additively manufactured inside the tubular portion 41 using a support removal device including a coolant supply device 7. The coolant supply device 7 supplies the coolant 72 having a predetermined properties into the tubular portion 41 at a predetermined amount and a predetermined rate in accordance with an operation instruction and recovers the coolant 72 discharged from the inside of the tubular portion 41.

That is to say, the coolant supply device 7 supplies the coolant 72 through one end side 42a of the tubular channel 42 and recovers the coolant 72 through the other end side 42b.

Thus, since the coolant 72 passes inside the coolant channel 71 as illustrated in FIG. 10, an inner wall (support 5F) of the coolant channel 71 is thermally shrunk to generate thermal stress and the support 5F naturally peels off. That is to say, since the support 5F is manufactured to have a density lower than that of the tubular portion 41, the heat transfer of the support 5F with which the coolant 72 comes into contact is fast, the support 5F is cooled earlier than the tubular portion 41 to cause thermal contraction, and thus the support 5F is peeled off at a boundary with the tubular portion 41 in which the heat transfer by the coolant 72 is slow.

It should be noted that, although the coolant 72 is used as a fluid in a sixth embodiment, the fluid may be a polisher as in the above-described embodiments.

Also, in this embodiment, since an angle of the ceiling portion 71a in the coolant channel 71 can be reduced by setting a channel cross section of the coolant channel 71 to a triangular shape, the ceiling portion 71a is easily formed. It should be noted that a cross-sectional shape of the coolant channel 71 in this embodiment is not limited to a triangular shape and may be a rhombic or elliptical cross-sectional shape.

[Method for Controlling Additive Manufacturing Device]

A method for controlling an additive manufacturing device for producing a manufactured object 9 according to each embodiment will be described below.

The above-described additive manufacturing device includes a control device 100. The control device 100 receives an input of a three-dimensional object model serving as three-dimensional graphic data indicating a shape of a three-dimensional object 4 and controls an operation of a laser device 2 on the basis of the three-dimensional object model.

(Constitution of Control Device)

Figure 11:
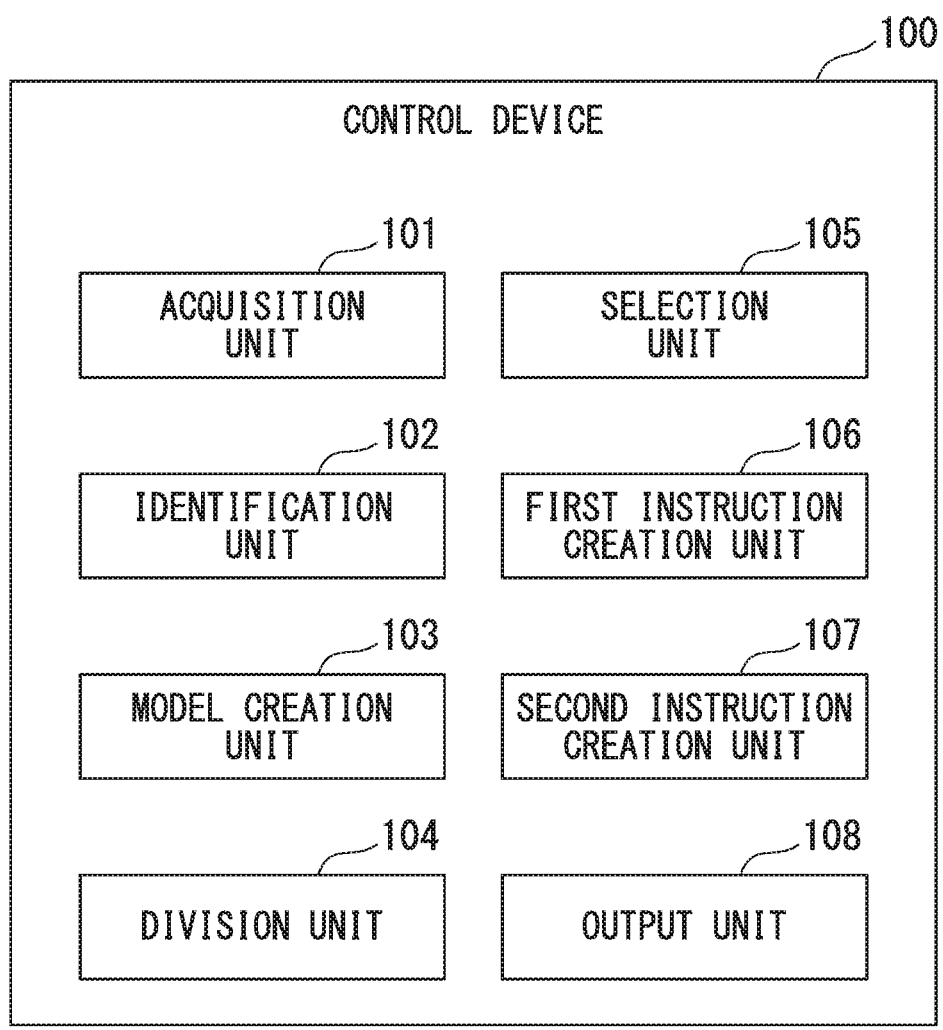
FIG. 11 is a schematic block diagram showing a software configuration of a control device.

FIG. 11 is a schematic block diagram showing a software constitution of a control device.

The control device 100 includes an acquisition unit 101, an identification unit 102, a model creation unit 103, a division unit 104, a selection unit 105, a first instruction creation unit 106, a second instruction creation unit 107, and an output unit 108.

The acquisition unit 101 acquires a three-dimensional object model serving as three-dimensional graphic data configured of a three-dimensional object figure indicating the shape of the three-dimensional object 4 which is a target. The three-dimensional object model may be, for example, three-dimensional graphic data created by computer-aided design (CAD) software.

The identification unit 102 identifies a position of a portion corresponding to an overhanging portion to be supported by a support member in the three-dimensional object figure included in the three-dimensional object model.

The model creation unit 103 creates a manufacturing model by adding a support figure indicating a shape of the support 5 below the overhanging portion in the three-dimensional object figure included in the three-dimensional object model. The manufacturing model is three-dimensional graphic data used for manufacturing control for the manufactured object 9. The three-dimensional object figure and the support figure have a data structure capable of determining the specific content of a figure by the control device 100 such as storing of an identifier for identifying whether the figure is the three-dimensional object figure or the support figure.

The control device 100 according to the first embodiment is an example of the manufacturing model creation device.

The division unit 104 creates a plurality of divided manufacturing models by dividing the manufacturing model created by the model creation unit 103 in a height direction. A division width by the division unit 104 (a height of each of the divided manufacturing models) is a length corresponding to a unit additive width.

The selection unit 105 selects a divided manufacturing model corresponding to an additive layer to be formed by the laser device 2 among the plurality of divided manufacturing models.

The first instruction creation unit 106 creates a first irradiation instruction for irradiating a portion of a powder bed 10 laid on a platform 1 corresponding to a three-dimensional object figure of a divided manufacturing model selected by a selection unit 105 with a laser beam 3. For example, the first instruction creation unit 106 creates a first irradiation instruction by dividing a portion corresponding to the three-dimensional object figure of the divided manufacturing model into a plurality of lattice regions and determining an order of irradiating each of the lattice regions with a laser beam 3 on the basis of a random number.

The second instruction creation unit 107 creates a second irradiation instruction for irradiating a portion of the powder bed 10 laid on the platform 1 corresponding to the support figure of the divided manufacturing model selected by the selection unit 105 with a laser beam 3 having an irradiation density lower than that of the first irradiation instruction.

The output unit 108 outputs the first irradiation instruction created by the first instruction creation unit 106 and the second irradiation instruction created by the second instruction creation unit 107 to the laser device 2.

(Operation of Control Device)

An operation of the control device will be described.

Figure 12:
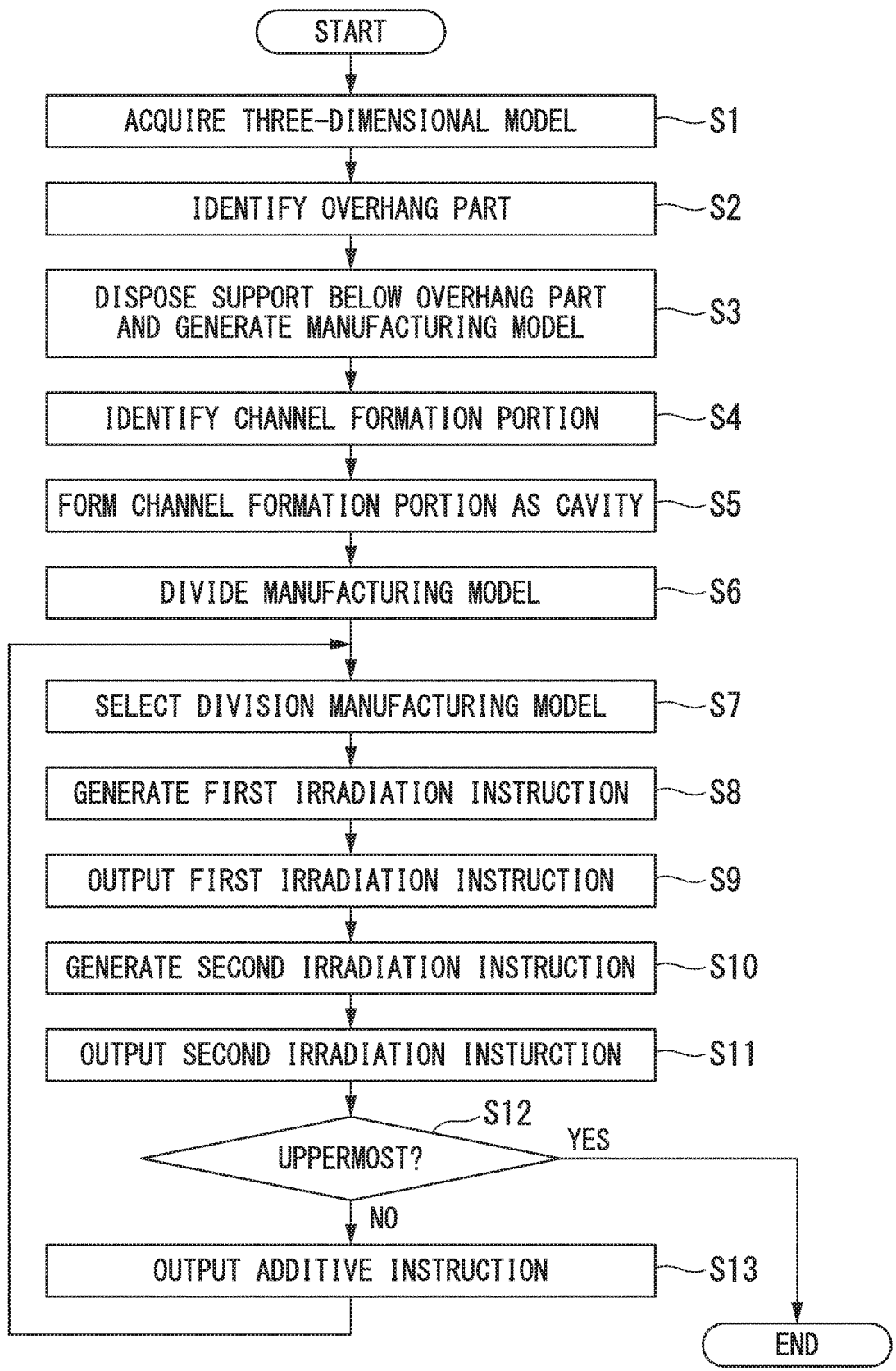
FIG. 12 is a flowchart for describing an operation of the control device.

FIG. 12 is a flowchart for describing the operation of the control device.

When the manufactured object 9 is manufactured in the additive manufacturing device, first, a user inputs a three-dimensional manufacturing model to the control device 100. The acquisition unit 101 in the control device 100 acquires a three-dimensional manufacturing model from the user (Step S1). Subsequently, the identification unit 102 identifies a position of an overhanging portion of a three-dimensional object figure included in the three-dimensional manufacturing model (Step S2). Subsequently, the model creation unit 103 creates a manufacturing model by adding a support figure indicating a shape of the support 5 in contact with a lower side of the overhanging portion to the three-dimensional object figure included in the three-dimensional manufacturing model (Step S3). Here, the model creation unit 103 identifies a portion in which a channel (polishing channel 51 or coolant channel 71) is to be formed on the basis of the shape of the created three-dimensional object figure (Step S4). Moreover, the model creation unit 103 forms a portion in which the channel is to be formed as a cavity in the three-dimensional object figure (Step S5). For example, when the three-dimensional manufacturing model is voxel data, the model creation unit 103 removes a voxel corresponding to the portion in which the channel is to be formed. Furthermore, for example, when the three-dimensional manufacturing model is polygon data, the model creation unit 103 forms a portion in which a channel is to be formed as a cavity by forming a polygon corresponding to an inner wall on the portion. Subsequently, the division unit 104 creates a plurality of divided manufacturing models by dividing the manufacturing model created by the model creation unit 103 in the height direction (Step S6).

Subsequently, the selection unit 105 selects a divided manufacturing model of the plurality of divided manufacturing models corresponding to an additive layer located in the lowest position among additive layers which are not manufactured yet (Step S7). The first instruction creation unit 106 creates a first irradiation instruction for irradiating a portion corresponding to the three-dimensional object figure of the divided manufacturing model selected in Step S7 with a laser beam 3 (Step S8). Subsequently, the output unit 108 outputs the first irradiation instruction to the laser device 2 (Step S9). The laser device 2 irradiates a powder material P with a relatively high density laser beam 3 in accordance with the first irradiation instruction. Thus, a sintered layer corresponding to the three-dimensional object 4 is formed.

The second instruction creation unit 107 creates a second irradiation instruction for irradiating the portion corresponding to the support figure of the divided manufacturing model with a laser beam 3 having a density lower than that of the first irradiation instruction (Step S10). Subsequently, the output unit 108 outputs the second irradiation instruction to the laser device 2 (Step S11). The laser device 2 irradiates the powder material P with a relatively lower density laser beam 3 in accordance with the second irradiation instruction. Thus, a sintered layer corresponding to the support 5 is formed.

Subsequently, the selection unit 105 determines whether the divided manufacturing model selected in Step S7 constitutes the uppermost portion of the manufacturing model (Step S12). This is equivalent to the determination of whether an additive layer corresponding to all of the plurality of divided manufacturing models is irradiated with the laser beam 3.

When it is determined that the divided manufacturing model selected in Step S7 does not constitute the uppermost portion of the manufacturing model (Step S12: NO), the output unit 108 outputs an additive layer instruction for forming a new powder bed 10 on the platform 1 to the additive manufacturing device (Step S13). When the additive layer instruction is output, the platform 1 moves downward by a thickness of the powder bed 10. Moreover, a powder material is supplied from a supply part (not shown), the powder material is leveled by a recoater (not shown), and thus a new powder bed 10 is formed on the platform 1. The process of the control device 100 returns to the process of Step S7 when outputting the additive layer instruction and the control device 100 selects a divided manufacturing model associated with the next additive layer.

On the other hand, when it is determined that the divided manufacturing model selected in Step S7 constitutes the uppermost portion of the manufacturing model (Step S12: YES), the control device 100 ends the control for the additive manufacturing device. Thus, the additive manufacturing device can manufacture the manufactured object 9 from which the support 5 can be easily removed by a fluid.

[Others]

Although the embodiments of the present invention have been described above, the shapes of the three-dimensional objects and the main parts thereof any of the embodiments are merely examples and the present invention can be applied to three-dimensional objects having various shapes.

Although the tubular channel space as the spaces having closed cross-sectional shapes have been exemplified in the embodiments, as long as a space are a space having a closed cross-sectional shape, an annular arrangement of a polishing channel is effective even when the space are not a tubular channel space. In addition, a constitution in which a polishing channel is provided inside a support is effective even when a space is not a space having a closed cross-sectional shape.

Also, although the SLM method is exemplified as an example of an additive manufacturing method in the embodiments, the present invention is not limited thereto and may be widely applied to additive manufacturing which needs a support.

Also, although the polisher is used as a fluid in the first to fifth embodiments, the fluid passing through the manufactured object 9 having the structure according to each of the first to fifth embodiments may be the coolant as in the sixth embodiment in other embodiments. Furthermore, the fluid is not limited to the polisher and the coolant and it is also possible to adopt other fluids such as an electrolyte.

In addition, although the circular cross-sectional shape is exemplified in the polishing channels 51, 51C, 51D, and 51E of the respective embodiments, a polishing channel having a triangular cross-sectional, rhombic, or second circular shape may be adopted in other embodiments as in the coolant channel 71 in the sixth embodiment.

Also, although the density of the support 5 is set smaller than the density of the three-dimensional object 4 by differentiating an irradiation density of the laser beam 3 by the three-dimensional object 4 and the support 5 in the method for controlling the additive manufacturing device according to the above-described embodiments, the present invention is not limited thereto. For example, in other embodiments, an irradiation time of the laser beam 3 with respect to a portion corresponding to the support 5 may be shorter than an irradiation time of the laser beam 3 with respect to a portion corresponding to the three-dimensional object 4 while setting irradiation densities of the laser beam 3 to have the same value. Furthermore, in other embodiments, the support 5 may be formed in a hollow when a part of the portion corresponding to the support 5 is irradiated with the laser beam 3 while setting irradiation densities of the laser beam 3 to be the same.

Also, for example, although the control device 100 creates the manufacturing model and controls the additive manufacturing device in the above-described embodiments, the present invention is not limited thereto in other embodiments. For example, a control device 100 associated with other embodiments may not create a manufacturing model. In this case, the control device 100 acquires a manufacturing model from the user or an external device (manufacturing model creation device).

[Computer Constitution]

Figure 13:
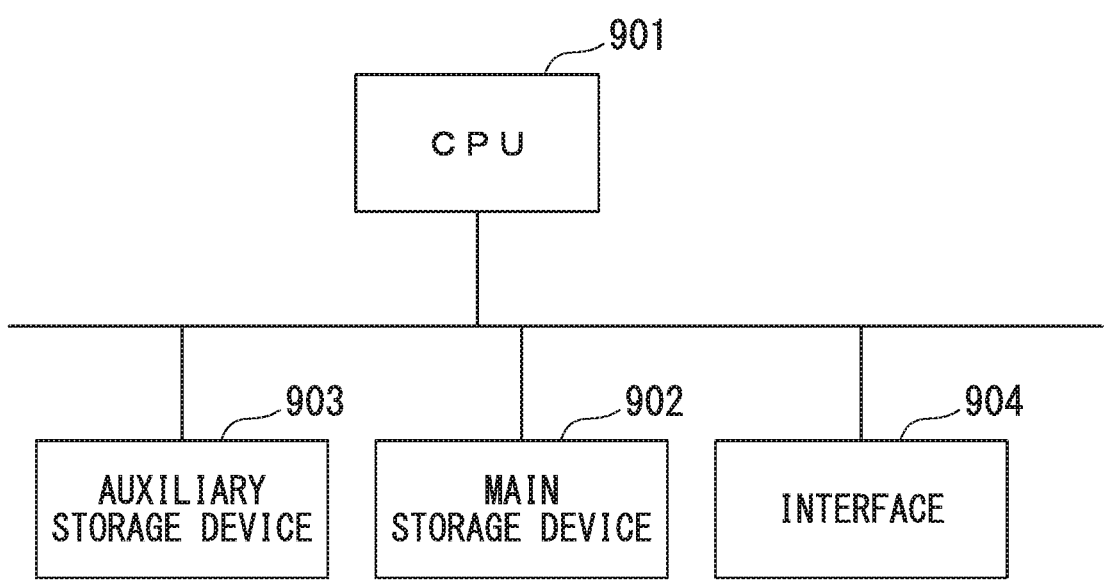
FIG. 13 is a schematic block diagram showing a configuration of a computer according to at least one embodiment.
Figure 14:
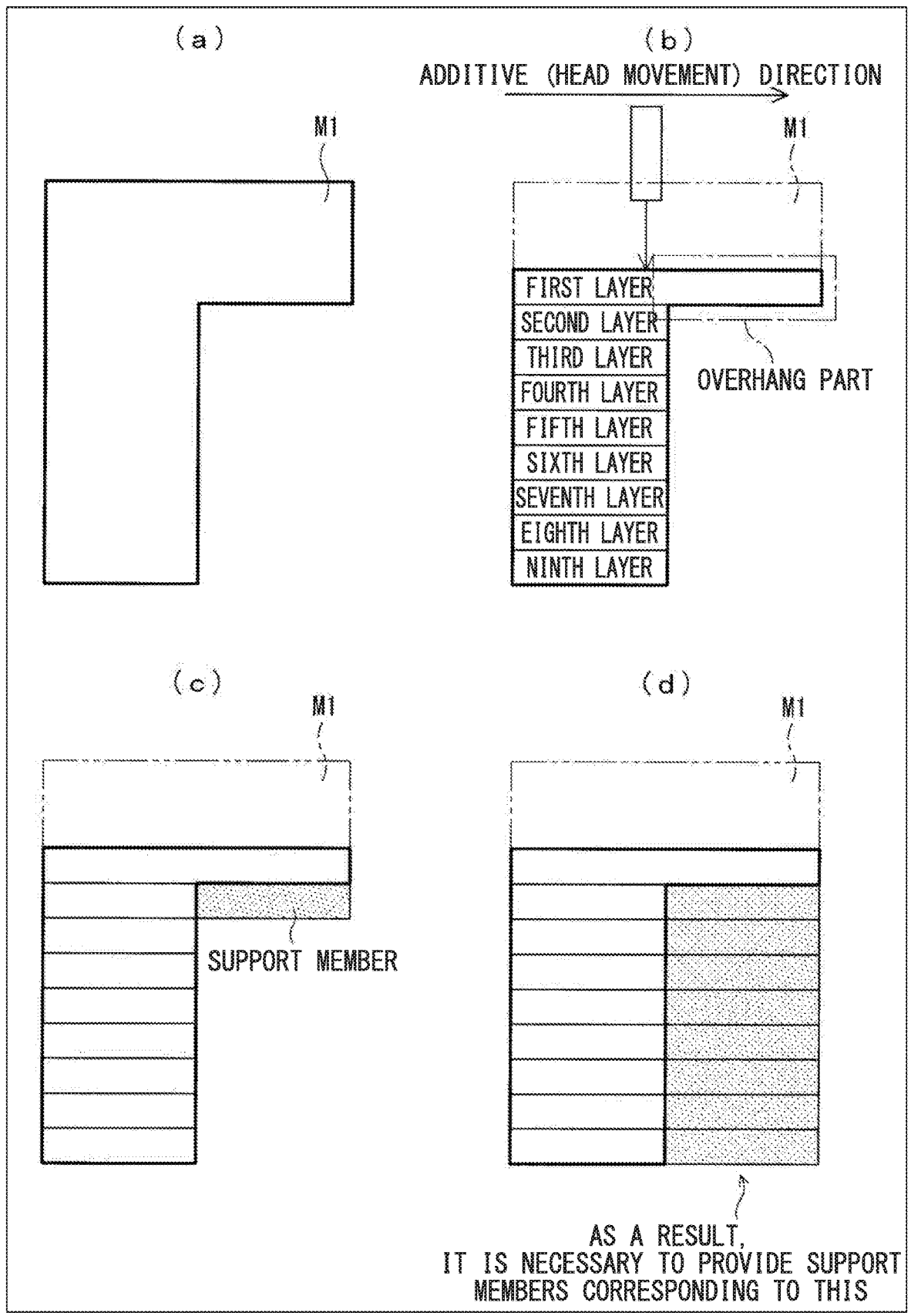
FIG. 14 is a diagram for explaining a support in an additive manufacturing method, (a) is a diagram showing a product shape having overhanging portion which requires a support, (b) to (d) are diagrams for explaining that a support is required for an overhanging portion.
Figure 15:
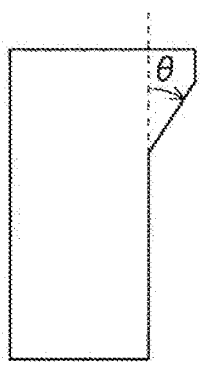
FIG. 15 is a diagram for explaining the necessity of a support due to an overhanging angle, (a) illustrates an overhanging angle in which a support is not required, (b) illustrates an overhanging angle (reference angle) 00 which is a reference for the necessity of a support, and (c) illustrates an overhanging angle in which a support is required.
Figure 15:
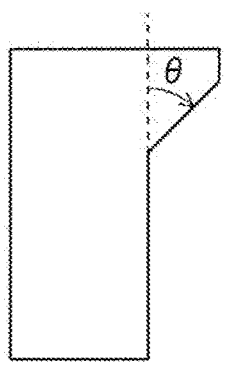
Figure 15:
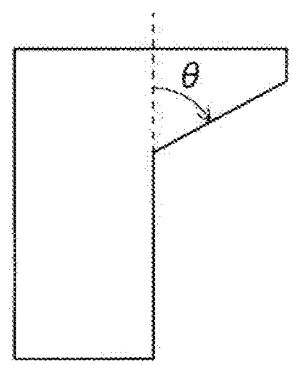

FIG. 13 is a schematic block diagram showing a constitution of a computer according to at least one embodiment.

A computer 900 includes a central processing unit (CPU) 901, a main storage device 902, an auxiliary storage device 903, and an interface 904.

The above-described control device 100 is installed in the computer 900. Moreover, operations of the respective processing units described above are stored in the auxiliary storage device 903 in the form of a program. The CPU 901 reads the program from the auxiliary storage device 903, develops the program in the main storage device 902, and executes the above processes in accordance with the program.

Examples of the auxiliary storage device 903 include a hard disk drive (HDD), a solid state drive (SSD), a magnetic disk, a magneto-optical disk, a compact disc read only memory (CD-ROM), a digital versatile disc read only memory (DVD-ROM), a semiconductor memory, and the like. The auxiliary storage device 903 may be an internal medium directly connected to a bus in the computer 900 and may be an external medium connected to the computer 900 via the interface 904 or a communication line. Furthermore, when the program is delivered to the computer 900 through the communication line, the computer 900 which receives the delivered program may develop the program in the main storage device 902 and execute the above processes. In at least one embodiment, the auxiliary storage device 903 is a non-transitory tangible type storage medium.

Also, the program may be for the purpose of realizing a part of the above-described functions.

In addition, the program may be a so-called differential file (differential program) which is realized in a combination of the above-described functions and another program stored in the auxiliary storage device 903 in advance.

INDUSTRIAL APPLICABILITY

According to at least one of the above aspects, it is possible to secure the shape accuracy of the three-dimensional object by the support for additive manufacturing disposed below the manufactured portion having a condition which needs a support when additively manufacturing the three-dimensional object.

Also, after manufacturing, the support for additive manufacturing can be removed by passing a fluid through the channel inside the support main body. Since the fluid can pass using a machine, it is possible to easily remove the support for additive manufacturing.

Since the channel is formed not to be exposed to the interface with the three-dimensional object inside the support main body, the fluid is not likely to directly pass along the surface of the three-dimensional object and it is possible to prevent the surface of the three-dimensional object from being cut and damaged with the fluid.

REFERENCE SIGNS LIST

1 Platform
2 Laser device
3 Laser beam
4, 4A Three-dimensional object
4OH Particular overhanging portion for three-dimensional object 4
5, 5', 5A to 5E Support member (support main body, support) for additive manufacturing
6 Polisher supply and recovery device
10 Powder bed
41, 41C, 41E Tubular portion
42 Tubular channel
42a One end side of tubular channel 42
42b The other end side of tubular channel 42
42c Side region of intermediate portion in tubular channel 42
Region immediately below particular overhanging portion
44 Interface between tubular portion 41 and support 5A (inner wall of tubular portion 41)
50a, 50b End wall of support main body 5A
51, 51C, 51D, 51E Polishing channel (channel)
51a, 51Da, 51Ea Inlets for polishing channels 51, 51D, and 51E
51b, 51Da, 51Ea Outlets for polishing channels 51, 51D, and 51E
52 Annular polishing channel (channel)
53 First channel control support
54 Second channel control support
61 Polisher (fluid)
71 Coolant channel (channel)
72 Coolant (fluid)
D Inner diameter of polishing channel 51
D0 Reference diameter
d1 Distance between polishing channels 51
d2 Distance between polishing channel 51 and interface 44
$\theta_0$ Reference angle

The invention claimed is:

1. A support member for additive manufacturing which is disposed below a manufactured portion of a three-dimensional object which needs a support in a process of additively manufacturing the three-dimensional object, comprising:
   a support main body; and
   a plurality of channels formed inside the support main body not to be exposed at an interface with the three-dimensional object and through which a fluid for removing the support main body is allowed to pass,
   wherein a tubular channel space having a closed cross-sectional shape is formed below the manufactured portion,
   the support main body is disposed in the tubular channel space
      so as to extend along at least a portion of the tubular channel space in a longitudinal direction,
      and such that throughout the portion of the tubular channel space in the longitudinal direction, the support main body comes into contact with the three-dimensional object over an entire inner circumference of the tubular channel space,
   wherein each channel of the plurality of channels has a tubular shape and is formed along a circumferential wall surface of the tubular channel space,
   wherein the tubular channel space includes a first end side space, in which the support main body is not disposed, at one end of the tubular channel space in the longitudinal direction,
   wherein each channel of the plurality of channels has an inlet which opens to the first end side space and an outlet which opens to an opposite end of the tubular channel space in the longitudinal direction, and
   wherein a first channel control support configured to control a flow of the fluid is arranged within the first end side space so as to be adjacent to the support main body.

2. The support member for additive manufacturing according to claim 1, wherein an inner diameter of each channel of the plurality of channels is set to be a reference diameter or less.

3. The support member for additive manufacturing according to claim 1, wherein the plurality of channels are formed parallel or substantially parallel to each other in the longitudinal direction of the tubular channel space.

4. The support member for additive manufacturing according to claim 3, wherein the plurality of channels are arranged such that a distance between neighboring channels is shorter than a distance between each of the channels and the interface.

5. The support member for additive manufacturing according to claim 1, wherein the tubular channel space includes a second end side space, in which the support main body is not disposed, at the opposite end of the tubular channel space in the longitudinal direction, and
    a second channel control support configured to control a flow of the fluid is arranged within the second end side space so as to be adjacent to the support main body.

6. The support member for additive manufacturing according to claim 1, which is formed to have a density lower than that of the three-dimensional object using a same material powder as the three-dimensional object.

7. The support member for additive manufacturing according to claim 1, wherein the three-dimensional object is a metallic three-dimensional object manufactured from a metal powder.

8. A production method for a three-dimensional object by additive manufacturing, comprising:
    additively manufacturing a three-dimensional object including a manufactured portion which needs a support and the support for additive manufacturing according to claim 1 disposed below the manufactured portion; and
    removing the support member for additive manufacturing by allowing the fluid to pass through the channels of the support member for additive manufacturing for the three-dimensional object in which the support member for additive manufacturing is integrally additively manufactured in the additive manufacturing of the three-dimensional object.

9. The production method for a three-dimensional object by additive manufacturing according to claim 8, wherein, in the additive manufacturing of the three-dimensional object, the three-dimensional object and the support for additive manufacturing are additively manufactured by a powder bed laser lamination welding method.

10. A production device for a three-dimensional object by additive manufacturing, comprising:
    an additive manufacturing device configured to additively manufacture a three-dimensional object including a manufactured portion which needs a support and the support for additive manufacturing according to claim 1 disposed below the manufactured portion; and
    a support removal device configured to remove the support member for additive manufacturing by allowing the fluid to pass through the channels of the support member for additive manufacturing for the three-dimensional object in which the support member for additive manufacturing is integrally additively manufactured by the additive manufacturing device.

11. The production device for a three-dimensional object by additive manufacturing according to claim 10, wherein the additive manufacturing device additively manufactures the three-dimensional object and the support for additive manufacturing by a powder bed laser lamination welding method.

12. A manufacturing model creation device which creates a manufacturing model serving as three-dimensional graphic data used for manufacturing control of a manufactured object having a three-dimensional shape, comprising:
    an acquisition unit configured to acquire a three-dimensional manufacturing model serving as three-dimensional graphic data composed of a three-dimensional object figure indicating a shape of the three-dimensional object;
    an identification unit configured to identify an overhanging portion serving as a manufactured portion in the three-dimensional object figure which needs a support; and
    a creation unit configured to create the manufacturing model by adding a support member figure indicating a shape of the support member for additive manufacturing according to claim 1 in contact with a lower side of the overhanging portion to the three-dimensional object figure.

13. A control device for an additive manufacturing device which manufactures a manufactured object having a three-dimensional shape by adding a material, comprising:
    a division unit configured to create a plurality of divided manufacturing models by dividing, in a height direction, a manufacturing model which includes
        a three-dimensional object figure indicating a shape of the three-dimensional object, and
        a support member figure indicating a shape of the support member for additive manufacturing including a support main body which supports an overhanging portion serving as a manufactured portion in the three-dimensional object which needs a support from below and a plurality of channels formed inside the support main body not to be exposed at an interface with the three-dimensional object and through which a fluid for removing the support main body is allowed to pass,
    wherein a tubular channel space having a closed cross-sectional shape is formed below the manufactured portion,
    the support main body is disposed in the tubular channel space
        so as to extend along at least a portion of the tubular channel space in a longitudinal direction,
        and such that throughout the portion of the tubular channel space in the longitudinal direction, the support main body comes into contact with the three-dimensional object over an entire inner circumference of the tubular channel space,
    wherein each channel of the plurality of channels has a tubular shape and is formed along a circumferential wall surface of the tubular channel space,
    wherein the tubular channel space includes a first end side space, in which the support main body is not disposed, at one end of the tubular channel space in the longitudinal direction,
    wherein each channel of the plurality of channels has an inlet which opens to the first end side space and an outlet which opens to an opposite end of the tubular channel space in the longitudinal direction,
    and wherein a first channel control support configured to control a flow of the fluid is arranged within the first end side space so as to be adjacent to the support main body;
    a selection unit configured to select a divided manufacturing model in order from a lower side among the plurality of divided manufacturing models;
    a first instruction creation unit configured to create a first irradiation instruction for irradiating a portion corresponding to the three-dimensional object figure of the selected divided manufacturing model in a material layer laid on a platform with a laser beam; and a second instruction creation unit configured to create a second irradiation instruction for irradiating a portion in the material corresponding to the support member figure of the selected divided manufacturing model with a laser beam so that a sintered layer having a density lower than that of a sintered layer formed through irradiation of a laser beam based on the first irradiation instruction is formed.

14. A manufacturing method for a manufactured object in which the manufactured object having a three-dimensional shape is manufactured by an additive manufacturing device adding a material, the method comprising:

creating a plurality of divided manufacturing models by dividing, in a height direction, a manufacturing model which includes
- a three-dimensional object figure indicating a shape of the three-dimensional object, and
- a support member figure indicating a shape of the support member for additive manufacturing including a support main body which supports an overhanging portion serving as a manufactured portion in the three-dimensional object which needs a support from below and a plurality of channels formed inside the support main body not to be exposed at an interface with the three-dimensional object and through which a fluid for removing the support main body is allowed to pass, wherein a tubular channel space having a closed cross-sectional shape is formed below the manufactured portion, the support main body is disposed in the tubular channel space
- so as to extend along at least a portion of the tubular channel space in a longitudinal direction,
- and such that throughout the portion of the tubular channel space in the longitudinal direction, the support main body comes into contact with the three-dimensional object over an entire inner circumference of the tubular channel space, wherein each channel of the plurality of channels has a tubular shape and is formed along a circumferential wall surface of the tubular channel space, wherein the tubular channel space includes a first end side space, in which the support main body is not disposed, at one end of the tubular channel space in the longitudinal direction, wherein each channel of the plurality of channels has an inlet which opens to the first end side space and an outlet which opens to an opposite end of the tubular channel space in the longitudinal direction, and wherein a first channel control support configured to control a flow of the fluid is arranged within the first end side space so as to be adjacent to the support main body;

selecting a divided manufacturing model in order from a lower side among the plurality of divided manufacturing models;

forming a sintered layer corresponding to the three-dimensional object by irradiating a portion corresponding to the three-dimensional object figure of the selected divided manufacturing model in a material layer laid on a platform with a laser beam; and forming a sintered layer corresponding to the support member for additive manufacturing having a density lower than that of a sintered layer corresponding to the three-dimensional object by irradiating a portion in the material corresponding to the support member figure of the selected divided manufacturing model with a laser beam.

* * * * *